United States Patent [19]

Mazaki et al.

[11] 3,915,938

[45] Oct. 28, 1975

[54] SOLUTION FOR FORMING HEAT RESISTANT POLYMERS

[75] Inventors: Shiro Mazaki; Yuzuru Noda; Makoto Kojima; Takashi Ishizuka, all of Osaka, Japan

[73] Assignee: Nito Electric Industrial Co. Ltd., Ibaragi, Japan

[22] Filed: June 29, 1973

[21] Appl. No.: 375,230

[30] Foreign Application Priority Data
July 1, 1972   Japan.................................. 47-65933

[52] U.S. Cl. ......... 260/77.5 AM, 77.5 R, 77.5 CA, 260/77.5 TB; 117/128.4

[51] Int. Cl.² ........................................ C08G 18/80

[58] Field of Search........... 260/77.5 AM, 77.5 R, 260/77.5 CA, 77.5 TB, 30.2, 32.6 NR

[56] References Cited
UNITED STATES PATENTS

| | | | |
|---|---|---|---|
| 3,594,351 | 7/1971 | Uchida et al................ | 260/77.5 CA |
| 3,725,353 | 4/1973 | Fujimoto et al............. | 260/77.5 CA |
| 3,761,451 | 9/1973 | Fujimoto et al............. | 260/77.5 CA |

*Primary Examiner*—M. J. Welsh
*Attorney, Agent, or Firm*—Sughrue, Rothwell, Mion, Zinn & Macpeak

[57]     ABSTRACT

A concentrated solution for forming improved heat resistant polymers comprising a mixture of a solution of a prepolymer having an amide group, an imide group and a hydantoin ring in the main chain of the molecule and having glycine derivatives in the terminals of the molecule and a blocked polyisocyanate compound in an amount approximately stoichiometrically equivalent to the prepolymer, the prepolymer having been prepared by reacting an excess amount of a polyvalent glycine derivative with the terminal isocyanate groups of an oligomer, the oligomer having been prepared by the reaction of an organic tribasic acid anhydride and an excess molar amount of an organic diisocyanate.

15 Claims, No Drawings

SOLUTION FOR FORMING HEAT RESISTANT POLYMERS

BACKGROUND OF THE INVENTION

1. FIELD OF THE INVENTION

The present invention relates to a solution for forming heat resistant polymers, more particularly, the invention relates to a concentrated solution suitable for forming a highly polymerized heat resistant polymer having an imide group, an amide group and a hydantoin ring in the main chain of the molecule and to a process of preparing the aforesaid solution.

2. DESCRIPTION OF THE PRIOR ART

It is well known that polyimide, polyamideimide, polyimidazole, and copolymers thereof have various excellent properties such as high heat resistance, high chemical resistance, etc., and are useful for electric wire coatings, films, laminates, coating materials, adhesives, varnishes for impregnation, etc., in particular, those to be used at high temperatures.

Such heat resistant polymers have generally been prepared by reacting starting materials (e.g., tetracarboxylic acid dianhydride and diamine in the case of producing a polyimide) in an organic polar solvent such as N-methyl-2-pyrrolidone, N,N-dimethylacetamide, etc., to form a polymer or a polymer precursor having a sufficiently high molecular weight, and then heat-treating the polymer or the polymer precursor to form the desired heat resistant polymer. The heat resistant polymer thus obtained is a infusible or insoluble material and is difficult to fabricate or work. Therefore, fabrication or processing is usually conducted at the solution stage of the polymer precursor having a sufficiently high molecular weight and, in this case, it is desired that the solution of the polymer precursor have a high density or concentration and a low viscosity, for processing and economic reasons.

However, if the final polymer thus fabricated is to have excellent properties, a polymer precusor having a sufficiently high molecular weight must be used, and to obtain such the solvent used for preparing the aforesaid polymer precursor is expensive and there are limits on the solubility of the precursor therein. Therefore, in the case of producing a polymer precursor having a sufficiently high molecular weight, the solution thereof inevitably has a high viscosity, which results in reducing the case of working the polymer precurosr, and if it is desired to reduce the viscosity of the solution, a large amount of the solvent must be used, which is uneconomical and disadvantageous in that the concentration of the solution is low.

Thus, in order to prepare a solution of a polymer precursor suitable for processing, a large amount of an expensive organic polar solvent is required, which results in an increase in the cost of the polymer precursor solution.

Accordingly, in spite of their excellent properties, conventional heat resistant polymers have been used only for rather limited and specific purposes.

SUMMARY OF THE INVENTION

After extensive investigations on solutions for forming heat resistant polymers of excellent workability which are economically advantageous without being accompanied by the aforesaid faults, the inventors discovered that a solution for forming heat resistant polymers having a high concentration and a low viscosity can be obtained in an inexpensive solvent using no or less expensive organic polar solvents.

That is, according to the present invention, there is provided a solution, particularly a concentrated solution for forming heat resistant polymers, comprising a mixture of a solution of a prepolymer having an imide group, a hydantoin ring and an amide group in the main chain of the molecule and a glycine derivative at the terminals of the molecule, and a stabilized polyisocyanate compound, preferably in an amount approximately stoichiometrically equivalent to the prepolymer. However, either the prepolymer or the polyisocyanate compound can be used in excess, i.e., up to 20% in excess of stoichiometric equivalence.

The above prepolymer solution is prepared by reacting a molar excess of a glycine derivative represented by the general formula

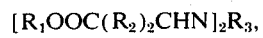

wherein
$R_1$ and $R_2$, which may be the same or different, each represents a hydrogen atom or a lower alkyl group and $R_3$ represents a divalent organic group,
and an amide-imide-oligomer having isocyanate groups at both terminals thereof, which oligomer is prepared by the reaction of the organic tribasic acid anhydride represented by the general formula

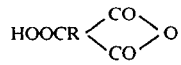

wherein R represents a trivalent organic group, a molar excessive of an organic diisocyanate.

The aforesaid concentrated solution thus obtained can be converted into a polymer having sufficient toughness and excellent heat resistance by heating it, after properly processing it according to the contemplated end use, to cause close-ring poly-condensation, while evaporating away the solvent.

Furthermore, the prepolymer solution used in this invention is obtained through a first step reaction in which the aforesaid organic tribasic acid anhydries is reacted with a molar excess of the organic isocyanate by heating in the absence of a solvent, or in a small amount of an organic polar solvent such as N,N-dimethylformamide, N,N-dimethylacetamide, N-methyl-2-pyrrolidone, etc., or a mixture of such an organic polar solvent and an organic nonpolar solvent such as toluene, xylene, benzene, solvent naphtha, etc., and a second step reaction in which the oligomer having isocyanate groups at both terminals thereof obtained in the first step reaction is reacted with a molar excess of a glycine derivative in the presence of an organic acid solvent such as phenol, cresol, xylenol, etc.

DETAILED DESCRIPTION OF THE INVENTION

As the organic tribasic acid anhydride used in the above mentioned first step reaction, there are illustrated trimellitic acid anhydride, 4-carboxydiphenylmethane-3',4'-dicarboxylic acid anhydride, 3-carboxydiphenylmethane-3', 4'-dicarboxylic acid anhydride, 4-carboxydiphenylether-3',4'-dicarboxylic acid anhydride, 3-carboxydipenylether-3',4'-dicarboxylic acid anhydride, 4-carboxydiphenylketone-3',4'-dicarboxylic acid anhydride and the like. They may be used individually or as a mixture thereof. Also, the above compound may be partially substituted by an organic dibasic acid such as terephthalic acid, isophthalic acid, etc.

The amount of the organic diisocyanate used in this reaction is 1.1–2.2 mols, preferably 1.2–2.0 mols, per mol of the organic tribasic acid anhydride. The concentration of the solution of the aforesaid starting material suitable to increase the reaction rate is 30–100% by weight, preferably 50–100% by weight. Furthermore, better results are obtained with less side reactions when the above reaction is conducted at a temperature in the range of 50°–200°C, preferably 80°–150°C.

As the glycine derivative used in the second step reaction, aromatic glycine derivatives are preferable, but alicyclic or aliphatic glycine derivatives may also be used. Examples of such glycine derivatives are p-phenylenebis(iminoacetic acid), m-phenylenebis(iminoacetic acid), 4,4'-diphenylenebis(iminoacetic acid), 4,4'-diphenylbis(iminoacetic acid), 4,4'-diphenyletherbis(iminoacetic acid), 4,4'-diphenylmethanebis(iminoacetic acid), 4,4'-benzophenonebis acid), 4,4'-diphenylsulfonebis(iminoacetic acid), p-cyclohexylenebis(iminoacetic acid), m-cyclohexylenebis(iminoacetic acd), hexamethylenebis(iminoacetic acid), the lower alkyl esters thereof and isomers thereof.

It is preferable that the glycine derivative containing imino acetic acid or a lower alkyl ester group used in the second step reaction be added in an amount of 1.1–2.2 times, preferably 1.2–2.0 times, the amount stoichiometrically equal to the terminal isocyanate groups of the oligomer prepared in the first step reaction. Also, in the second reaction, it is preferable to dilute the reaction system with an organic acid solvent so that the concentration of the reaction system is in the range of 20–80% by weight, particularly 30–60% by weight. It is further preferable to conduct the reaction at temperatures above 30°C, particularly at 120°–210°C.

One embodiment of producing an amide-imide-hydantoin propolymer having glycine derivatives at both terminals thereof is illustrated below.

1. First step reaction:

This reaction is a decarboxylation reaction, and since the reaction proceeds gradually at about 80°C with the generation of carbon dioxide, it is necessary to remove the carbon dioxide thus generated from the reaction system. When the reaction is continued at 100°–150°C, the color of the reaction solution gradually changes from red-brown to black-brown as the reaction progresses. The end of the reaction can be determined by estimating the isocyanate groups by the n-butylamine method. It is necessary, when the isocyanate content of the reaction system reaches the theoretical amount, to stop the reaction by rapidly cooling the reaction system or by blocking the active isocyanate groups a known manner by adding an organic acid solvent, such as phenol, cresol or xylenol as is used in the second step reaction. This is necessary because the active isocyanate groups at the terminals of the amide-imide oligomer will undergo, after the completion of the reaction with the organic tribasic acid anhydride, side reactions with the organic polar solvent, etc., to lower the activity thereof, whereby the same cannot be used in the subsequent second step reaction.

2. Second step reaction:

The oligomer soluton obtained in the first step reaction is diluted with an organic acid solvent and, after adding thereto the glycine derivative, the temperature of the solution is gradually raised, the reaction proceeding at about 120°C while distilling off water in the case of using the iminoacetic acid and distilling off alcohol in the case of using the iminoacetic acid alkyl ester. When the temperature of the reaction system is further raised and the reaction is continued for 3–4 hours at 190°–200°C, the reaction is completed, and a solution of a prepolymer having an imide group, hydantoin ring and an amide group in the main chain of the molecule and the glycine derivative at both terminals thereof is obtained.

The amide-imide oligomer obtained in the first step reaction does not always show good solubility in organic acid solvents, but the prepolymer having the glycine derivative at both terminals of its molecule obtained in the second step reaction has the feature that the prepolymer can be dissolved in an inexpensive organic acid solvent at a surprizingly high concentration.

As the blocked polyisocyanate compound mixed with the prepolymer solution prepared above, blocked compounds obtained by the reaction of a polyisocyanate and a compound or compounds represented by the formula

ROH wherein R represents an aromatic, alicyclic or aliphatic monovalent group, are used.

As such blocked compounds, blocked compounds of a polyisocyanate having at least one of an imide group, a hydantoin ring and an amide group in the main chain of the molecule give particularly preferable results for obtaining a concentrated solution giving heat resistant polymers which show excellent heat resistance and mechanical and electric properties. However, the following blocked compounds may also be used in this invention. That is, there are blocked compounds of diisocyanates or dithioisocyanates such as p-phenylenediisocyanate, 2,4-tolyenediisocyanate, 1,5-naphthylenediisocyanate, 4,4'-diphenylmethanediisocyanate, 4,4'-diphenyletherdiisocyanate, hexamethylenediisocyanate, cyclohexane-1,4-diisocyanate, p-phenylenedithioisocyanate, 4,4'-diphenylmethanedithiocyanate, etc., as well as blocked compounds of polyisocyanates having a comparatively low molecular weight, such as the blocked compounds commercially available from Farbenfabriken Bayer Aktiengesellshaft in Germany under the trade names Desmodur AP-Stable, Desmodur CT-Stable, etc.

In addition, as the compound represented by the formula ROH described above, phenol, cresol, xylenol, and alcohols can be used.

Furthermore, as the aforesaid blocked compounds of a polyisocyanate having at least one of an imide group, hydantoin ring and an amide group in the chain of the molecule thereof, the following compounds are illustrative.

A. A blocked compound of an imide group-containing polyisocyanate prepared by reacting (by heating) 1,2,3,4-butanetetracarboxylic acid (hereinafter called BTC) or a dianhydride thereof (hereinafter, the anhydride is called BTCA) and a molar excess of an organic diisocyanate in a solvent such as phenol, cresol, xylenol or a mixture thereof.

The amount of the organic diisocyanate used in this reaction is 1.1–2.2 mols, preferably 1.3–2.0 mols, per mol of BTC or BTCA, and when the reactants are heated in the aforesaid solvent, a decarboxylation and dehydration reaction occurs at 130°–140°C, but side reactions between the water which is formed and the isocyanate group hardly occur. This is because the isocyanate group is blocked by the phenol, cresol, or xylenol and stabilized at the temperature of the dehydration reaction. When the temperature is further raised and the reaction is continued at 150°–200°C, the isocyanate group forms an imide group by reaction with BTC or BTCA to provide an imide group-containing polyisocyanate, and, thereafter, when the temperature is decreased to below 150°C, the terminal isocyanate groups react with the solvent to provide a blocked compound.

It is preferable to increase the reaction rate, that the concentration of the reaction solution be 10–90% by weight, particularly 30–60% by weight.

A concentrated solution prepared by mixing the blocked compound of the imide group-containing polyisocyanate thus obtained and the solution of amide group-, imide group- and hydantoin ring-containing prepolymer is suitable for forming a heat resistant coating for electric wires having excellent flexibility, close-adhesivity and freon resistance when the solution is used as a varnish for enameled wires.

B. A blocked compound of a polyisocyanate having iso-cyanate groups at both terminals of the molecule and containing an amide group and an imide group prepared by reacting an organic tribasic acid anhydride and a molar excess of an organic diisocyanate.

The amount of the organic diisocyanate used in this reaction is 1.1–4.0 mols, preferably 1.2–2.0 mols, per mol of the organic tribasic acid anhydride, and by reacting both reactants in an organic polar solvent at 50°–200°C, preferably 80°–150°C, an amide group- and imide group containing polyisocyanate is produced.

It is preferable that the reaction described above be conducted in a system whose concentration is as high as possible, preferably at a concentration of 50–100% by weight. The reaction gradually proceeds with the generation of carbon dioxide, and the reaction system becomes black-brown as the reaction progresses. The end of the reaction can be determined by estimating the iso-cyanate group by the n-butylamine method. By blocking the iso-cyanate groups when the isocyanate group content of the reaction product reaches the theoretical amount with phenol, cresol, xylenol, or alcohols in a known manner, a blocked polyisocyanate compound containing an amide group and an imide group is obtained.

A concentrated solution prepared by mixing the blocked compound thus prepared and the aforesaid solution of the prepolymer having an amide group, an imide group and a hydantoin ring is effective for forming heat resistant electric wires having excellent abrasion resistance, chemical resistance and freon resistance when used as varnish for enameled wires.

C. A blocked compound of a polyisocyanate having a hydantoin ring (a part of which may be hydantoic acid or the lower alkyl ester thereof) in the main chain of the molecule and having isocyanate groups at the terminals of the molecule prepared by reacting a glycine derivative and a molar excess of an organic diisocyanate.

The amount of the organic diisocyanate used in this reaction is 1.1–4.0 mols, preferably 1.2–2.0 mols, per mol of the glycine derivative, and by reacting the reactants for 3–5 hours at 30°–210°C in an organic acidic solvent such as cresol, xylenol, etc., a polyisocyanate having a hydantoin ring or, as the case may be, a functional group capable of forming a hydantoin ring, in the main chain of the molecule and having isocyanate groups at both terminals of the molecule is prepared.

It is preferable that the concentration of the reaction solution be as high as possible, preferably 50–90% by weight.

The reaction is continued for 20–60 minutes at 30°–60°C, and then, when the temperature of the reaction system is gradually raised, the reaction proceeds at about 120°C. In the case of using iminoacetic acid as the glycine derivative water is distilled off during the reaction and in the case of using the alkyl ester of iminoacetic acid, alcohol is distilled off during the reaction. As the reaction progresses, the reaction system becomes black-brown. When the temperature is further raised and the reaction is continued for 3–4 hours at 190°–200°C, a polyisocyanate having the theoretical isocyanate content is obtained. After the reaction is completed, the reaction product solution is cooled, whereby the isocyanate groups of the polyisocyanate react with the solvent used to provide a blocked compound.

A concentrated solution prepared by mixing the blocked compound thus obtained and the aforesaid solution of the prepolymer containing an amide group, an imide group and a hydantoin ring is effective for forming heat resistant electric wires having excellent flexibility, abrasion resistance and chemical resistance when used as a varnish for enameled wires.

Various blocked compounds of polyisocyanates were illustrated above together with examples of producing such blocked compounds. To obtain the desired concentrated solution of this invention, the blocked compound is mixed with the prepolymer having an amide group, an imide group and a hydantoin ring, which is another component of this invention. Either of these components can be used in excess, i.e., up to 20% in excess of the equivalent amount, but the components are preferably used in an approximately equivalent amount.

The term "stoichiometrically equivalent" means that one iminoacetic acid group or iminoacetic acid alkyl ester group of the aforesaid prepolymer is used per one isocyanate group of the aforesaid blocked compound.

By mixing, as mentioned above, the aforesaid prepolymer and a blocked compound at the stoichiometric equivalent ratio, a heat resistant polymer of high molecular weight and excellent electrical, mechanical and thermal properties is obtained by heating the solution containing both components.

Furthermore, the prepolymer having the amide group, imide group and hydantoin ring contained in the solution has a comparatively low molecular weight and good solubility, while the blocked polyisocyanate compound has properties similar to the prepolymer. Accordingly, the viscosity of the concentrated solution of this invention can be greatly reduced.

Therefore, the solution of this invention for forming heat resistant polymers has the feature that it can be used at very high concentrations. For example, when the solution is used as a varnish for enameled wires, the non-volatiles content of the solution can be 20–50% by weight and the viscosity thereof can be 500–10,000 c.p. (30°C), preferably 1,000–6,000 c.p. (30°C). Further, when the solution is used as a material for forming films, the non-volatiles component of the solution can be 30–60% by weight and the viscosity thereof can be 30,000–150,000, preferably 50,000–120,000, c.p. (30°C). That is, since the solution has a high concentration and a comparatively low viscosity, the solution is very useful from working and economic aspects.

Post-hardening of the solution after removing the solvent to obtain a film of the heat resistant polymer from the solution may be conducted at temperatures of 150°–500°C.

The solution of this invention also has the feature that it is not significantly denatured or degraded when it is stored for a long period of time, that is, the solution has excellent storage stability.

Further, the solution can be used at various desired concentrations and viscosities for use as a varnish for impregnation, laminates, adhesives, etc., in addition to film forming use.

The prepolymer having an amide group, an imide group and a hydantoin ring used in the solution of this invention for forming heat resistant polymers may be prepared, for example, as in Examples A–D, and the polyisocyanate blocked compounds for the same purpose may be prepared, for example, as in Examples E–G.

EXAMPLE A

In a one liter four-necked flask equipped with a condenser, a thermometer and a stirrer were placed 125 g (0.5 mol) of 4,4'-diphenylmethanediisocyanate, 48 g (0.25 mol) of trimellitic acid anhydride and 80 g of N,N-dimethylformamide. When the mixture was gradually heated with stirring, decarboxylation began at 70°–80°C. The temperature was further raised and the reaction continued at 110°C. When the temperature reached 110°C, the estimation of the isocyanate groups in the reaction system was conducted with the progress of the reaction. When the isocyanate content reached the theoretical value after about 2 hours and 30 minutes, 240 g of industrial cresol was added to the reaction system to stop the reaction. The isocyanate equivalent of the amide-imide oligomer obtained was 308 (theoretical value 302). The term "isocyanate equivalent" means the molecular weight of oligomer per one isocyanate group.

When 168 g (0.49 mol) of 4,4'-diphenylmethanebis(-methyl iminoacetate) was added to the solution prepared above and the temperature of the mixture was gradually raised while stirring, de-methanolization occured at about 150°C. The temperature of the reaction system was further raised while distilling away the methanol formed and the reaction was further conducted for 3 hours at 200°–210°C, whereby 598 g of a concentrated solution of amide-imide-hydantoin prepolymer was obtained. The solution was diluted with industrial cresol to provide a solution having a non-volatiles content of 35.8% by weight (after drying for 2 hours at 200°C) and a solution viscosity of 2,880 c.p. (30°C).

EXAMPLE B

In the same flask as in Example A were placed 125 g (0.5 mol) of 4,4'-diphenylmethanediisocyanate, 57.6 g (0.3 mol) of trimellitic acid anhydride, 60 g of N-methyl-2-pyrrolidone and 40 g of xylene. The mixture was heated gradually while stirring, whereby decarboxylation began at 70°–80°C. The temperature of the reaction system was further raised and the reaction conducted at 100°C. When the temperature reached 100°C, the estimation of the isocyanate groups in the reaction system was conducted with the progress of the reaction. When the isocyanate content reached the theoretical value after about 5 hours and 30 minutes, 240 g of industrial cresol was added to the reaction system to stop the reaction. The isocyanate equivalent of the amide-imide oligomer was 392.8 (theoretical value 390.5).

Then, 102 g (0.298 mol) of 4,4'-diphenylmethanebis(methyl iminoacetate) was added to the above solution and the temperature of the reaction mixture was gradually raised with stirring, whereby de-methanolization began at about 150°C. While distilling away the methanol formed from the system, the temperature of the reaction system was further raised and the reaction was conducted for 3 hours at 200°–210°C, whereby 573 g of a concentrated solution of an amide-imide-hydantoin prepolymer was obtained. The solution was diluted with 127 g of industrial cresol to provide a solution having a non-volatiles content of 35.4% by weight (after drying for 2 hours at 200°C) and a viscosity of 11,650 c.p. (30°C).

EXAMPLE C

In the same flask as in Example A were placed 126 g (0.5 mol) of 4,4'-diphenyletherdiisocyanate, 48 g (0.25 mol) of trimellitic acid anhydride, 8.3 g (0.05 mol) of isophthalic acid, 70 g of N,N-dimethylacetamide and 30 g of xylene and the mixture was gradually heated with stirring, whereby decarboxylation began at 70°–80°C. The temperature was further raised to 120°C. When the temperature reached 120°C, the estimation of the isocyanate groups in the reaction system was conducted with the progress of the reaction. When the isocyanate content reached the theoretical value after about 3 hours and 30 minutes, 240 g of industrial cresol was added to the reaction system to stop the reaction. The isocyanate equivalent of the amide-imide oligomer obtained was 394.6 (theoretical value 389.8).

Then, 135.8 g (0.395 mol) of 4,4'-diphenyletherbis(-methyl iminoacetate) was added to the above solution and the temperature of the reaction system was gradually raised with stirring, with de-methanolization occurring at about 150°C. The temperature of the reaction system was further raised while distilling away the methanol formed from the reaction system and the reaction was conducted for 3 hours at 200°–210°C, whereby 603 g of a concentrated solution of an amide-imide-hydantoin prepolymer was obtained. The solution was diluted with 200 g of industrial cresol to provide a solution having a non-volatiles content of 34.6% (after drying for 2 hours at 200°C) and a solution viscosity of 6,370 c.p. (30°C).

EXAMPLE D

In the same flask as in Example A were placed 125 g (0.5 mol) of 4,4'-diphenylmethanediisocyanate, 76.8 g (0.4 mol) of trimellitic acid anhydride, 60 g of N-methyl-2-pyrrolidone and 40 g of toluene and the temperature was gradually raised with stirring, whereby decarboxylation began at 70°–80°C. The temperature of the reaction system was further raised and the reaction further continued at 100°C. When the temperature reached 100°C, the estimation of the isocyanate groups in the reaction system was conducted with the progress of the reaction. When the isocyanate content of the reaction product reached the theoretical value after about 5 hours and 10 minutes, 240 g of industrial cresol was added to the reaction system to stop the reaction. The isocyanate equivalent of the amide-imide oligomer thus obtained was 846.5 (theoretical value 833).

Then, 67.4 g (0.197 mol) of 4,4'-diphenylmethanebis(methyl iminoacetate) was added to the above solution and the temperature of the mixture was raised with stirring, with de-methanolization beginning at 150°C. When the temperature was further raised while distilling away the methanol formed from the reaction system and the reaction was further conducted for 3 hours at 200-210°C, 553 g of a concentrated solution of amide-imide-hydantoin prepolymer was obtained. The solution had a non-volatiles content of 40.7% by weight (after drying for 2 hours at 200°C) and a solution viscosity of 72,600 c.p. (30°C).

EXAMPLE E

In the same flask as in Example A were placed 250 g (1 mol) of 4,4'-diphenylmethanediisocyanate and 367 g of industrial cresol and then the mixture was heated for 1 hour at 150-165°C with stirring to block the isocyanate groups with the cresol. Thereafter, 117 g (0.5 mol) of BTC was added to the mixture, whereby imidation proceeded with the generation of water and carbon dioxide. During the reaction, water, carbon dioxide, and an azeotrope of cresol were distilled away. Then, while maintaining the reaction system at 150° to 165°C for 5 hours, 45 g of industrial cresol was added thereto and then the mixture was cooled. Thus, 655 g of a solution of an imide group-containing polyisocyanate blocked compound having an isocyanate equivalent of 308.3 (theoretical value 305) was obtained. The solution had a non-volatiles content of 45.4% by weight, and a solution viscosity of 82,400 c.p. (30°C).

The term "isocyanate equivalent" means the molecular weight of imide group-containing polyisocyanate per one isocyanate group.

EXAMPLE F

In the same flask as in Example A were placed 250 g (1 mol) of 4,4'-diphenylmethanediisocyanate, 153.6 g (0.8 mol) of trimellitic acid anhydride, 100 g of N-methyl-2-pyrrolidone and 76 g of xylene, and then the mixture was heated with stirring. The mixture became a homogeneous solution, and when the temperature of the solution was raised to 100°C. the reaction which proceeded was the vigorous generation of carbon dioxide. When the solution was further heated at the same temperature, the color of the solution turned black-brown after 2 hours and the isocyanate content reached approximately the theoretical value after 4 hours and 30 minutes. At this time, 683 g of industrial cresol was added to the product and the mixture was stirred for 1 hour at 150°–160°C to block the isocyanate groups with cresol followed by cooling. Thus, a solution of an imide group- and amide group-containing polyisocyanate blocked compound having an isocyanate equivalent of 839.2 (theoretical value 833) was obtained. The solution had a non-volatiles content of 30.4% by weight, and a solution viscosity of 2,150 c.p. (30°C).

EXAMPLE G

In the same flask as in Example A were placed 250 g (1 mol) of 4,4'-diphenylmethanediisocyanate and 490 g of industrial xylenol, and the former dissolved in the latter at 35°–45°C. Then, 239.6 g (0.7 mol) of 4,4'-diphenylmethanebis(methyl iminoacetate) was added to the solution and then the reaction was conducted for 30 minutes at 50°C. When the temperature of the reaction system was further raised, de-methanolization began at about 150°C and the viscosity of the system increased. The temperature of the reaction system was further raised while removing methanol from the system and the reaction continued for 3 hours at 200-210°C. Then, by adding 178 g of industrial cresol to the reaction mixture and cooling it, a solution of the blocked hydantoin-containing polyisocyanate having an isocyanate equivalent of 750.3 (theoretical value 743) was obtained. The solution had a non-volatiles content of 39.7% by weight and a solution viscosity of 8,750 c.p. (30°C).

The solution of this invention for forming heat resistant polymers will be explained more practically by the following examples.

EXAMPLE 1

By mixing well 400 g of the amide-imide-hydantoin prepolymer solution prepared in Example A above and 790 g of the solution of the blocked compound of the imide group-containing polyisocyanate obtained in Example F above by means of a stirrer, a solution having a non-volatiles content of 32.0% by weight and a viscosity of 2,250 c.p. (at 30°C) was obtained. When the solution was stored for 6 months at 30°C, changes in its properties such as viscosity changes, discoloration, etc., were hardly observed. The above-prepared solution was applied to an annealled copper wire having a diameter of 1.00 mm using a die and baked at a tower temperature of 420°C and a speed of 6.0 m/min in a vertical research tower having a length of 3 meters. The properties of the resulting enameled wire are shown in Table 1.

EXAMPLE 2

By mixing well 400 g of the amide-imide-hydantoin prepolymer solution prepared in Example B, 74.7 g of the solution of the blocked polyisocyanate compound prepared in Example E, and 110 g of industrial cresol by means of a stirrer, a solution having a non-volatiles content of 30.3% by weight and a viscosity of 5.820 c.p. (30°C) was obtained. When the solution was stored for 6 months at 30°C, changes in the properties thereof were hardly observed. The properties of an enameled wire obtained by coating and baking the above solution in the same manner as described in Example 1 are shown in Table 1.

EXAMPLE 3

By mixing well 400 g of the amide-imide-hydantoin prepolymer solution prepared in Example C, 630 g of the solution of the blocked hydantoin ring-containing polyisocyanate compound prepared in Example G and 260 g of industrial cresol by a stirrer, a solution having a non-volatiles content of 30.6% by weight and a viscosity of 850 c.p. (at 30°C) was obtained. The solution thus obtained showed no changes in physical properties after storage for 6 months at 30°C. The properties of the enameled wire obtained by coating and baking the above solution in the same manner as described in Example 1 are shown in Table 1.

EXAMPLE 4

By mixing well 400 g of the amide-imide-hydantoin prepolymer solution prepared in Example D and 195 g of the solution of the blocked imide group-containing polyisocyanate compound prepared in Example E, a solution having a non-volatiles content of 42.0% by weight and a viscosity of 77,600 c.p. (30°C) was obtained. The solution was cast onto a glass plate and dried and hardened for 30 minutes at 180°C and then for 30 minutes at 250°C, and then the film formed was stripped from the glass plate to provide a flexible film. The properties of the film thus obtained are shown below.

| | |
|---|---|
| Thickness of film | 50 μ |
| Tear strength (ASTM 1004-61T) | 420 g/mil |
| Tensile strength (ASTM 883-61T) | 18.1 Kg/mm |
| Elongation (ASTM 883-61T) | 28 % |
| Volume resistivity | >10$^{18}$ |
| Dielectric constant | 3.5 |
| Dielectric loss tangent | 0.024 |

EXAMPLE 5

By mixing well 400 g of the amide-imide-hydantoin prepolymer prepared in Example D and 246 g of the solution of the blocked hydantoin ring-containing polyisocyanate compound prepared in Example G by means of a stirrer, a solution having a non-volatiles content of 40.5% by weight and a viscosity of 62.100 c.p. (30°C) was obtained.

When the solution was cast on a glass plate in a thickness of 50 microns and dried and hardened for 30 minutes at 180°C and then for 30 minutes at 250°C, a flat film of high toughness and high abrasion resistance was obtained.

Furthermore, the solution was diluted with industrial cresol so that the non-volatiles content thereof became 30% by weight and coated and baked on an annealed copper wire having a diameter of 1.00 mm by using dies at a tower temperature of 430°C and a speed of 6.5 m/min in a vertical research tower having length of 3 meters. The properties of the enameled wire thus treated are shown in Table 1.

EXAMPLE 6

By mixing well 400 g of the amide-imide-hydantoin prepolymer prepared in Example A and a solution of 72 g of Desmodur CT-Stable (trade name, sold by Farbenfabriken Bayer Aktiengesellshaft in Germany) in 150 g of industrial cresol, a solution having a non-volatiles content of 29.6% by weight and a viscosity of 740 c.p. (30°C) was obtained.

A plane weave glass cloth having a thickness of 0.18 mm was impregnated with the solution prepared as above so that the resin content was 50% by weight of the cloth, and then the cloth was dried for 30 minutes at 180°C to remove the solvent.

Twelve sheets of this "prepreg" were formed and heated for 10 minutes between a press machine heated to 350°C under low pressure and then pressed under a pressure of 150 Kg/cm². The laminate thus obtained had a bending strength of 45–50 Kg/mm² at room temperature, a bending strength of 42 Kg/mm² at 200°C, and a water absorption factor of 0.9%. Also, the heating loss of the laminate after storage for 10 days at 250°C was 1.1% by weight.

EXAMPLE 7

To 400 g of the prepolymer solution prepared by the process shown in Example B were added 26.6 g of the blocked compound prepared by blocking 4,4'-diphenylmethanediisocyanate with cresol and 130 g of cresol, and the mixture mixed while heating at 100°–120°C to provide a solution having a non-volatiles content of 30.8% by weight and a viscosity of 1,650 c.p. (30°C). The solution was coated and baked on an annealed copper wire having a diameter of 1.00 mm by using dies under the same conditions as in Example 1. The properties of the enameled wire thus treated are shown in Table 1.

TABLE 1

| | | Example 1 | Example 2 | Example 3 | Example 5 | Example 7 |
|---|---|---|---|---|---|---|
| Structure of wire | Bare wire diameter (mm) | 1,000 | 1,000 | 1,000 | 1,000 | 1,000 |
| | Overall diameter (mm) | 1,084 | 1,080 | 1,080 | 1,082 | 1,081 |
| | Film thickness (mm) | 0.042 | 0.040 | 0.040 | 0.041 | 0.0405 |
| Appearance of wire | Naked eye evaluation | Good | Good | Good | Good | Good |
| Flexibility | Ordinary state | 1d | 1d | 1d | 1d | 1d |
| | 5% pre-elongation | 1d | 1d | 1d | 1d | 1d |
| | 10% " | 1d | 1d | 1d | 1d | 1d |
| | 15% " | 1d | 1d | 1d | 1d | 1d |
| | 20% " | 2d | 1d | 2d | 2d | 2d |
| | After heat aging (200°C × 24 hrs.) | 1d | 2d | 1d | 1d | 2d |
| Abrasion resistance | Reciprocating, 600 g.wt. (times) | 300< | 245 | 300< | 300< | 300< |
| | Unidirectional scrapes (g) | 2,850 | 2,630 | 2,770 | 2,730 | 2,780 |
| Twist resistance | 20 cm length (times) | 82 | 90 | 79 | 81 | 78 |
| Heat shock resistance | 220°C × 2 hrs. | 1d | 1d | 1d | 1d | 1d |
| | 240°C × 2 hrs. | 1d | 1d | 1d | 1d | 1d |
| | 260°C × 2 hrs. | 1d | 1d | 1d | 1d | 1d |
| Break-down voltage | Ordinary state (KV) | 13.1 | 12.8 | 13.6 | 13.0 | 12.6 |
| | After heat aging 260°C × 168 hrs. (KV) | 12.6 | 11.2 | 12.8 | 12.4 | 11.9 |
| Pinholes in water | 3% pre-elongation | Good | Good | Good | Good | Good |

TABLE 1 -Continued

| | | Example 1 | Example 2 | Example 3 | Example 5 | Example 7 |
|---|---|---|---|---|---|---|
| Cut-through temp. | 2.1 Kg.wt., 2°C/min (°C) | 486 | 431 | 468 | 451 | 478 |
| Chemical resistance (pencil hardness) | 5% NaOH (20°C × 24 hrs.) | 8H | 7H | 8H | 8H | 8H |
| | 10% NaOH ( " ) | 8H | 7H | 8H | 8H | 8H |
| Blister test | Blister condition | Pre-elongation 0% | | | | |
| R-22 - oil (1 : 1) 70°C × 168 hrs. | 120°C × 30 mins. | 5% 10% | | | | |
| | | 0% | | | | |
| | 160°C × 30 mins. | 5% 10% | | | | |

(Note 1) The mark (d) in Table 1 shows wire diameter. For example, 2d indicates double wire diameter and means that the test sample can be wound in a double wire diameter without faults.
(Note 2) The blister resistance test in Table 1 was conducted by stretching the sample wire heat-treated for 15 minutes at 150°C to 0%, 5% or 10%, treating the sample in R-22-oil (1 : 1) for 168 hours at 70°C using an autoclave, treating the sample in a dryer for 30 minutes at 120°C and for 30 minutes at 160°C, and then observing the state of the formation of blisters of the sample.

In addition, the mark ⊚ in Table 1 stands for the case where no foams were observed; the mark ○ stands for the case where foams were scarcely observed.

While the invention has been described in detail and with reference to specific embodiments thereof, it will be apparent to one skilled in the art that various changes and modifications can be made therein without departing from the spirit and scope thereof.

What is claimed is:

1. A solution for forming heat resistant polymers comprising a mixture of a solution of a prepolymer having an amide group, an imide group and a hydantoin ring in the main chain of the molecule and having glycine derivatives at the terminals of the molecule and a blocked polyisocyanate compound in an amount approximately stoichiometrically equivalent to said prepolymer, said prepolymer having been prepared by reacting an excess of a polyvalent glycine derivative with the terminal isocyanate groups of an oligomer having terminal isocyanate groups, which oligomer was prepared by the reaction of an organic tribasic acid anhydride and molar excess of an organic diisocyanate, wherein said polyvalent glycine derivative has the general formula:

[R₁OOC(R₂)₂CHN]₂R₃ , wherein R₁ and R₂, which may be the same or different, each represents a hydrogen atom or a lower alkyl group and R₃ represents a divalent organic group.

2. A solution as claimed in claim 1 wherein said prepolymer or said blocked polyisocyanate compound are present in an amount of plus or minus 20% of stoichiometric equivalency.

3. A solution as claimed in claim 1 wherein said organic tribasic acid anhydride has the general formula:

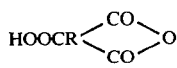

wherein R represents a trivalent organic group.

4. A solution as claimed in claim 3 wherein said organic tribasic acid anhydride is selected from the group consisting of trimellitic acid anhydride, 4-carboxydiphenylmethane-3',4'-dicarboxylic acid anhydride, 3-carboxydiphenylmethane-3',4'-dicarboxylic acid anhydride, 4-carboxydiphenylether-3',4'-dicarboxylic acid anhydride, 3-carboxydiphenylether-3',4'-dicarboxylic acid anhydride and 4-carboxydiphenylketone-3',4'-dicarboxylic acid anhydride.

5. A solution as claimed in claim 1 wherein said polyvalent glycine derivative is selected from the group consisting of p-phenylenebis(iminoacetic acid), m-phenylenebis(iminoacetic acid), 4,4'-diphenylenebis(iminoacetic acid), 4,4'-diphenylbis(iminoacetic acid), 4,4'-diphenyletherbis(iminoacetic acid), 4,4'-diphenylmethanebis(iminoacetic acid), 4,4'-benzophenonebis(iminoacetic acid), 4,4'-diphenylsulfonebis(iminoacetic acid), p-cyclohexylenebis(iminoacetic acid), m-cyclohexylenebis(iminoacetic acid), hexamethylenebis(iminoacetic acid), the lower alkyl esters thereof and the isomers thereof.

6. A solution as claimed in claim 1 wherein the amount of the organic diisocyanate used to prepare the oligomer is from 1.1 to 2.2 moles per mol of the organic tribasic acid anhydride.

7. A solution as claimed in claim 1 wherein the blocked polyisocyanate compound has at least one of an amide group, a hydantoin ring or an amide group in the main chain of its molecule.

8. A solution as claimed in claim 1 wherein said blocked polyisocyanate compound is obtained by the reaction of a polyisocyanate and a compound represented by the formula:

ROH wherein R represents an aromatic alicyclic or aliphatic monovalent group.

9. A solution as claimed in claim 1 wherein the blocked polyisocyanate compound is obtained by blocking a diisocyanate or dithioisocyanate.

10. A solution as claimed in claim 9 wherein the blocked compound is selected from the group consisting of p-phenylenediisocyanate, 2,4-tolylenediisocyanate, 1,5-naphthylenediisocyanate, 4,4'-diphenylmethanediisocyanate, 4,4'-diphenyletherdiisocyanate, hexamethylenediisocyanate, cyclohexane-1,4-diisocyanate, p-phenylenedithiosocyanate and 4,4'-diphenylmethanedithiocyanate.

11. A solution as claimed in claim 1 wherein the blocked polyisocyanate compound is blocked with phenol, cresol, xylenol or an alcohol.

12. A solution as claimed in claim 1 wherein the polyvalent glycine derivative is used in an amount of 1.1 to 2.2 times an amount stoichiometrically equal to the terminal isocyanate groups of the oligomer.

13. A solution as claimed in claim 1 having a non-volatiles content of 20–50% by weight and a viscosity of 500 – 10,000 c.p. (30°C).

14. A solution as claimed in claim 1 having a non-volatiles content of 30–60% by weight and a viscosity of 30,000 – 150,000 c.p. (30°C).

15. A heat resistant polymer produced from the solution of claim 1.

* * * * *

UNITED STATES PATENT AND TRADEMARK OFFICE
CERTIFICATE OF CORRECTION

PATENT NO. : 3,915,938
DATED : October 28, 1975
INVENTOR(S) : Shiro Mazaki et al It is certified that error appears in the above-identified patent and that said Letters Patent are hereby corrected as shown below:

Column 1 of first page, item [73], correct the name of the Assignee to read: "NITTO ELECTRIC INDUSTRIAL CO., LTD.".

Column 3, line 23, before "acid)," insert --(iminoacetic--.

Column 13 and 14, line 13, after "70°C.X" move "0%" over to the column where it belongs under "10%", and insert the values in the table:

After:  Insert:

| | | | | | |
|---|---|---|---|---|---|
| 0% | ⊙ | ⊙ | ⊙ | ⊙ | ⊙ |
| 5% | ⊙ | ⊙ | ⊙ | ⊙ | ⊙ |
| 10% | ⊙ | ⊙ | ⊙ | ⊙ | ○ |
| 0% | ⊙ | ⊙ | ⊙ | ⊙ | ⊙ |
| 5% | ⊙ | ⊙ | ⊙ | ⊙ | ⊙ |
| 10% | ⊙ | ⊙ | ○ | ○ | ○ |

Signed and Sealed this

Seventeenth Day of August 1976

[SEAL]

Attest:

RUTH C. MASON
*Attesting Officer*

C. MARSHALL DANN
*Commissioner of Patents and Trademarks*